United States Patent [19]

Woodcock

[11] 3,960,754

[45] June 1, 1976

[54] MULTI-WAVELENGTH OPTICAL FILTER

[75] Inventor: Richard Forrest Woodcock, South Woodstock, Conn.

[73] Assignee: American Optical Corporation, Southbridge, Mass.

[22] Filed: Aug. 1, 1974

[21] Appl. No.: 493,587

[52] U.S. Cl. .............................. 252/300; 106/47 R; 106/54; 428/428
[51] Int. Cl.² ........................................... G02B 5/22
[58] Field of Search ....... 252/300, 301.1 F, 301.1 P; 106/47 R, 54; 428/428

[56]     References Cited
         UNITED STATES PATENTS

| 2,532,386 | 12/1950 | Armistead | 106/54 |
| 2,805,166 | 9/1957 | Löffler | 106/54 |
| 3,726,698 | 4/1973 | Hares et al. | 252/300 |

*Primary Examiner*—Benjamin R. Padgett
*Assistant Examiner*—Deborah L. Kyle
*Attorney, Agent, or Firm*—H. R. Berkenstock, Jr.; William C. Nealon

[57]     ABSTRACT

A multi-wavelength optical filter, particularly useful for shielding against laser light, includes compounds incorporated into a glass base which produce $Cu^{2+}$ ions, $Er^{3+}$ ions, and $Ce^{3+}$ ions, thereby providing a filter having desired optical densities at 488 nm, 515 nm, 530 nm, 671 nm, 694 nm, 1060 nm, 840–900 nm, 347 nm, and 337 nm.

5 Claims, No Drawings

MULTI-WAVELENGTH OPTICAL FILTER

Laser light is a very high energy light beam, and workers in the art require protection from this radiation, particularly the eyes of the workers require shielding from the high energy radiation. Optical filters in the form of eyeglasses, face shields, goggles and the like, have heretofore, been suggested for protection against such high energy radiation. The known filters, however, are in the form of thin films of plastic which have an incorporated compound which provides filtering elements. For example, U.S. Pat. No. 2,861,896 describes a filter formed of a thin plastic film having finely divided particles of elemental copper dispersed in the film. The elemental copper particles produce the filtering effect, and the filtering action is, therefore, based on the scattering of light rather than on absorption. In U.S. Pat. No. 2,816,047, there is described a thin plastic film which has an organic dye absorbed on the surface of the preformed film. The dried organic dye is then reacted in a solution of an aqueous oxidizing agent, such as a soluble copper salt, to produce a compound which absorbs the radiation. In one specific example, aniline is absorbed on a film, and this is reacted with a soluble copper salt. The result of the reaction is the production of a mixture of oxidation products of aniline or aniline derivatives which have overlapping bands of absorption. In this case, the dye is the material which absorbs the radiation.

Another surface absorption effect is shown in U.S. Pat. No. 3,104,176, where a synthetic plastic film is immersed in a copper salt solution. The copper salts are deposited on the film surface and on the surface of the pores in the film. The salts, thus dispersed on the film surface, produces strictly a surface effect of radiation absorption.

In the prior art filters, the films used are very thin and they require support, for example, such as cementing the films onto glass or other types of lenses. The thinness of the film, the low concentration of the absorbing or dispersing materials in or on the films limits the absorption characteristics of such filters. Furthermore, the major absorption effects are surface effects, and as the compounds absorb considerable quantities of energy, there is a resultant buildup of heat near the surface of the film. This heat readily causes thermal decomposition and actual destruction of the film. Furthermore, the luminescent transmission of the prior art filters, that is, the transmission of light in the visible wavelengths, has been poor thereby cutting down not only on the visability of the user of the filter, but also, a reduction of the ability of the user to distinguish colors through the filter.

It is, therefore, among the objects and advantages of the present invention to provide a multiple wavelength optical filter.

Another object of the invention is to provide a multiple wavelength optical filter for protection against neodymium laser radiation at 1060 nm (nanometers), gallium arsenide radiation at 840–900 nm, frequency doubled neodymium laser radiation at 530 nm, argon laser radiation at 515 and 488 nm, ruby radiation at 694 nm, frequency doubled ruby laser radiation at 347 nm, and all other shorter wavelengths.

Still another object of the invention is to provide a multi-wavelength optical filter composed of at least one glass base having dispersed throughout compounds which will produce $Cu^{2+}$, $Er^{3+}$ and $Ce^{3+}$ ions in the glass.

Yet another object to the invention is to provide a multi-wavelength optical filter having high luminescent transmittance.

A still further object of the invention is to provide a multi-wavelength optical filter through which colors in the visible wavelengths are readily discernable.

These and other objects and advantages of the invention may be readily ascertained by referring to the following description which is illustrative of the invention and not limiting thereof.

Various types of lasers lase at different wavelengths. For example, neodymium lasers emit radiation at 1060 nm, gallium arsenide lasers at 840–900 nm, argon gas lasers at 515 and 488 nm, etc. Due to the very high energy of the laser beam, it is imperative to protect workers near the laser from the visible as well as the non-visible radiation. In particular, it is important to protect the workers eyes from the very high energy radiation. As the number of different types of lasers increases, so also the number of different wavelengths of emitted radiation against which the worker must be protected expands.

Some laser light emission is in the infrared or near infrared ranges; however, some extends into the visible spectrum. A practical broadband optical filter for filtering out the dangerous rays obviously can not be built for the entire range of wavelengths of lasers, since some do extend into the visible spectrum. Thus, the filtering of all of the wavelengths emitted by all lasers, from the infrared through most of the visible spectrum, would prevent a user from seeing anything through a broadband optical filter. It is, therefore, necessary to selectively absorb the major wavelengths produced by particular lasers.

According to the present invention an optical filter is provided for multi-wavelengths of laser radiation, which includes a host glass of ophthalmic quality having incorporated therein compounds which produce $Cu^{2+}$, $Er^{3+}$ and $Ce^{3+}$ ions in the filter. This combination of ions absorb radiations emitted by lasers in the range of 694 nm, 1060 nm, 530 nm, 515 nm and 488 nm, in addition to the absorption of frequency doubled ruby and other laser emissions in the ultra-violet range. The glass base for the particular filters affects the shape of the resulting spectral curve, and in particular, the steepness of the curves near the pertinent wavelengths. The base glass effects the absorption coefficient and the width of the absorption bands, particularly for the $Er^{3+}$ ion.

In a specific example, a phosphate glass, which is well known in the art, is doped with 50 wt. % of $ER_2O_3$, 4 wt. % of CuO, and 0.3 wt. % of $CeO_2$. The mix for the glass and the other ingredients are melted and then formed to a glass plate of about 3.5 mm thickness, which is the normal thickness of safety glass. The glass has an optical density of about 3.5. This optical filter is effective in absorbing emissions at 1060 nm, 840–900 nm, 530 nm, 515 nm, 488 nm, 347 nm and all other shorter wavelengths. The absorption in the middle of the visible spectrum consists of a series of very narrow bands, and, therefore, the visual transmittance through the filter is good. Also, colors are readily identifiable when viewed through the filter.

The amount of the $CeO_2$ which may be used in the formulation extends from 0.1 to 5 wt. %; the amount of the $Er_2O_3$ extends in the range of 25–75 wt. %, and amount of CuO runs from 0.5–10 wt. %. There are other compounds which are useful for incorporating into the host glass for producing the particular cations necessary for the desired absorption. In place of the erbium oxide, for example, erbium chloride, erbium nitrate, erbium phosphate, etc. may be used in the glass melt for producing the $Er^{3+}$ ions. In place of the cesium oxide, other cesium salts such as cesium chloride, cesium nitrate, cesium phosphate may be used. In place of the cupric oxide salt, such compounds as cupric chloride, cupric nitrate, cupric acetate, cupric bromide, cupric phosphate, etc. may be used in sufficient quantity to give an equivalent amount of the cations in the melt. In changing from one compound to another, the weight percent of the compound is adjusted to produce approximately the same cation concentration in the glass melt. The colorants, in general, must be soluble in the melt, and thorough mixing insures a uniform dispersion in the host glass.

Various glasses may be used as the base or host glass; but, when all of the compounds are included in a single glass base, phosphate glass is the preferred host. Other glasses such as lanthanum borate, alumino-silicate, barium crown, dense flints, soda lime, rubidium crown, fluoride type glasses, etc. may be used. Each of the host glasses produces an effect on the width of the absorption bands. Some broadening of the band at 520 nm is known to occur as a function of the glass composition. Absorption at 530 nm may be due to a weak side band at 533 nm or a broadening of 520 nm peak, or a combination of the two. Depending upon the use for the multi-wavelength optical filter, a compromise may be made in the choice of glass between the advantage gained in increased optical density by broadening the absorption peaks, and the disadvantage incurred in the loss of visual transmission due to the broadening of the peaks.

The compounds may be added to a single host glass forming a filter of a single glass, or one or more of the additives may be dispersed in one host glass and the remainder in a second host glass. Also, each cation producing compound may be included in a separate host glass. The individual filters may then be laminated to obtain a filter containing the desired filtering cations. The glass chosen as the host for the cations may be chosen to produce a variety of effects on the absorption characteristics, transmittance or the like.

One form of laminated filter is made by melting and pouring a boro-silicate glass composition which includes 45 weight percent of $Er_2O_3$ and 0.3 weight percent of $CeO_2$. A second glass melt of a phosphate glass with 5-6 5-6 weight percent of cupric oxide is poured. The two formed glasses are then cemented together, forming a laminated filter. The preferred boro-silicate glass, made according to conventional procedures, has the following composition by weight on an oxide analysis:

| | |
|---|---|
| $Er_2O_3$ | 45 wt % |
| $SiO_2$ | 11.7 |
| $B_2O_3$ | 11.7 |
| $Al_2O_3$ | 1.6 |
| MgO | 1.6 |
| BaO | 17.2 |
| $ZrO_2$ | 1.6 |
| $La_2O_3$ | 8.7 |
| $As_2O_3$ | .8 |
| $CeO_2$ | .25 |

A three glass laminated filter is made in a similar manner with one cation producing compound in a host glass, and then cementing, or otherwise securing the glasses in face engagement. The glasses may be formed into desired configurations by conventional practices.

I claim:

1. A multi-wavelength optical filter for protection against laser radiation comprising at least one base glass composition, all percentages on an oxide basis, containing from 0.1–5 weight percent of a compound producing $Ce^{3+}$ ions, 25–75 weight percent of a compound producing $Er^{3+}$ ions and 0.5–10 weight percent of a compound producing $Cu^{2+}$ ions, said compounds being soluble in at least a melt of a base glass composition so as to be uniformly distributed throughout the base composition.

2. A multi-wavelength optical filter according to claim 1 wherein said base glass is a phosphate glass.

3. A multi-wavelength optical filter according to claim 1 wherein said cation producing compounds are oxides.

4. A multi-wavelength optical filter according to claim 3 wherein 50 weight percent of $Er_2O_3$, 0.3 weight percent of $CeO_2$ and 4 weight percent of CuO are present in said base glass.

5. A multi-wavelength optical filter according to claim 4 wherein all said compounds are incorporated in a single base glass of the phosphate type.

* * * * *

UNITED STATES PATENT OFFICE
CERTIFICATE OF CORRECTION

PATENT NO. : 3,960,754
DATED : June 1, 1976
INVENTOR(S) : Richard F. Woodcock

It is certified that error appears in the above-identified patent and that said Letters Patent are hereby corrected as shown below:

On the last page of the patent, Column 3, lines 7, 8, and 9, in each instance where "cesium" occurs, change to --cerium--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*